(12) United States Patent
Turner et al.

(10) Patent No.: US 8,359,715 B2
(45) Date of Patent: Jan. 29, 2013

(54) TRIM CLIP

(75) Inventors: Phillip M. Turner, Montrose, MI (US);
Yueh-Se J. Huang, Ann Arbor, MI (US);
Pei-Chung Wang, Troy, MI (US);
Sharon K. Martin, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 769 days.

(21) Appl. No.: 12/030,914

(22) Filed: Feb. 14, 2008

(65) Prior Publication Data

US 2008/0201914 A1    Aug. 28, 2008

Related U.S. Application Data

(60) Provisional application No. 60/892,012, filed on Feb. 28, 2007.

(51) Int. Cl.
*F16B 39/02* (2006.01)
*A44B 99/00* (2010.01)

(52) U.S. Cl. ...... 24/297; 411/82; 411/82.3; 24/DIG. 11; 24/453; 24/289

(58) Field of Classification Search .................. None
See application file for complete search history.

(56) References Cited

U.S. PATENT DOCUMENTS

| | | | | |
|---|---|---|---|---|
| 4,176,428 A | * | 12/1979 | Kimura | 24/326 |
| 4,514,125 A | * | 4/1985 | Stol | 411/82.3 |
| 5,689,863 A | * | 11/1997 | Sinozaki | 24/297 |
| 6,537,006 B1 | * | 3/2003 | Clark | 411/82 |

FOREIGN PATENT DOCUMENTS

| | | |
|---|---|---|
| GB | 2334298 A | 8/1999 |
| JP | 5240228 A | 9/1993 |
| JP | 5332331 A | 12/1993 |
| JP | 200598347 A | 4/2005 |
| JP | 3774845 B2 | 3/2006 |
| JP | 3813429 B2 | 6/2006 |
| KR | 1020060028114 A | 3/2006 |

OTHER PUBLICATIONS

PCT International Search Report, PCT International Application No. PCT/US2008/055073, International Filing date: Feb. 27, 2008, Date of Mailing: Jul. 29, 2008.
PCT Written Opinion of the International Searching Authority, International Application No. PCT/US2008/055073, International Filing date: Feb. 27, 2008, Date of Mailing: Jul. 29, 2008.

* cited by examiner

*Primary Examiner* — Jack W. Lavinder
(74) *Attorney, Agent, or Firm* — Cantor Colburn LLP

(57) ABSTRACT

A trim clip for securing a panel to a structural part is disclosed herein. The trim clip includes: a captivating part having an anchor; a body part having a cavity for receiving the anchor; and means for locking the captivating part to the body part. Wherein the body part is engageable with the structural part and has a first flange for seating against the structural part. Wherein the captivating part has a second flange for seating against the panel. Wherein the captivating part and the body part in an unlocked state have a lateral float, an axial float, and an angular tilt float therebetween. Wherein the captivating part and the body part in a locked state have substantially no lateral float, no axial float, and no angular tilt float therebetween.

10 Claims, 15 Drawing Sheets

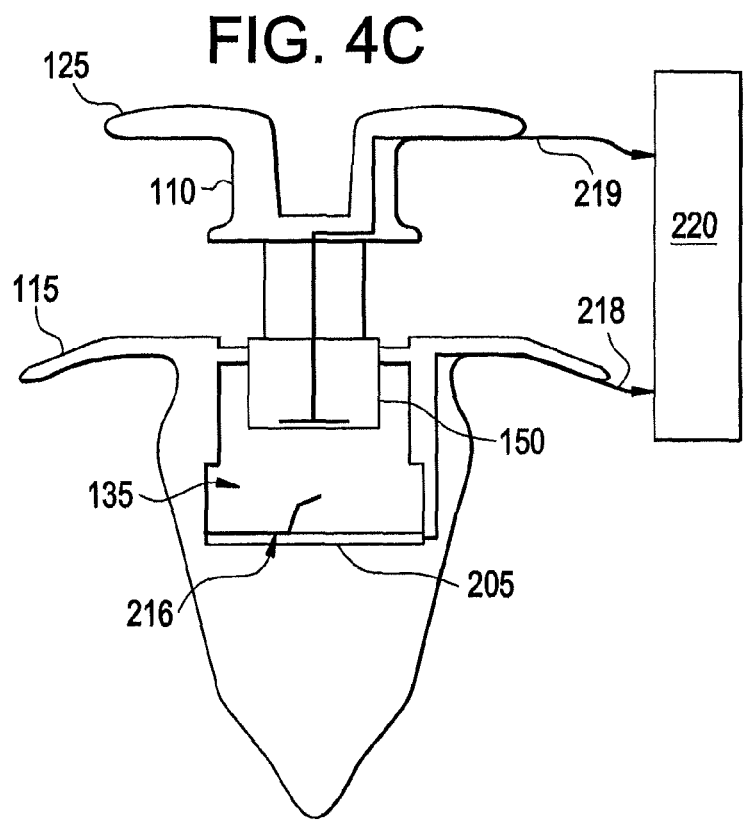
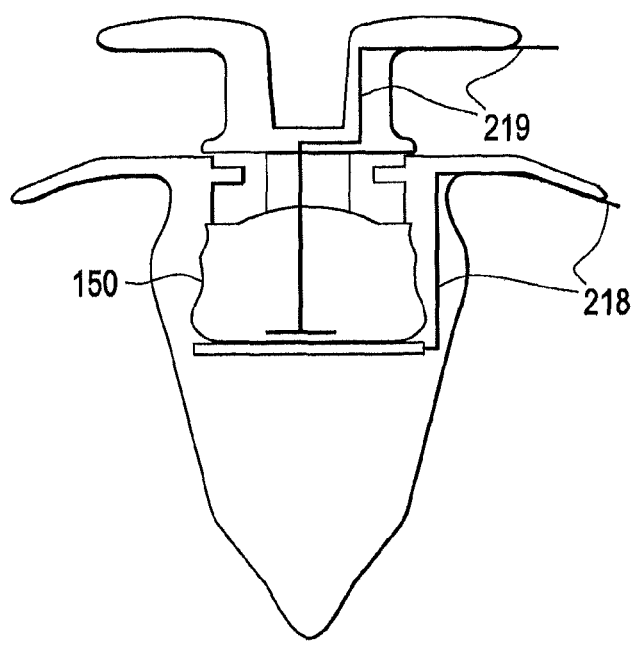

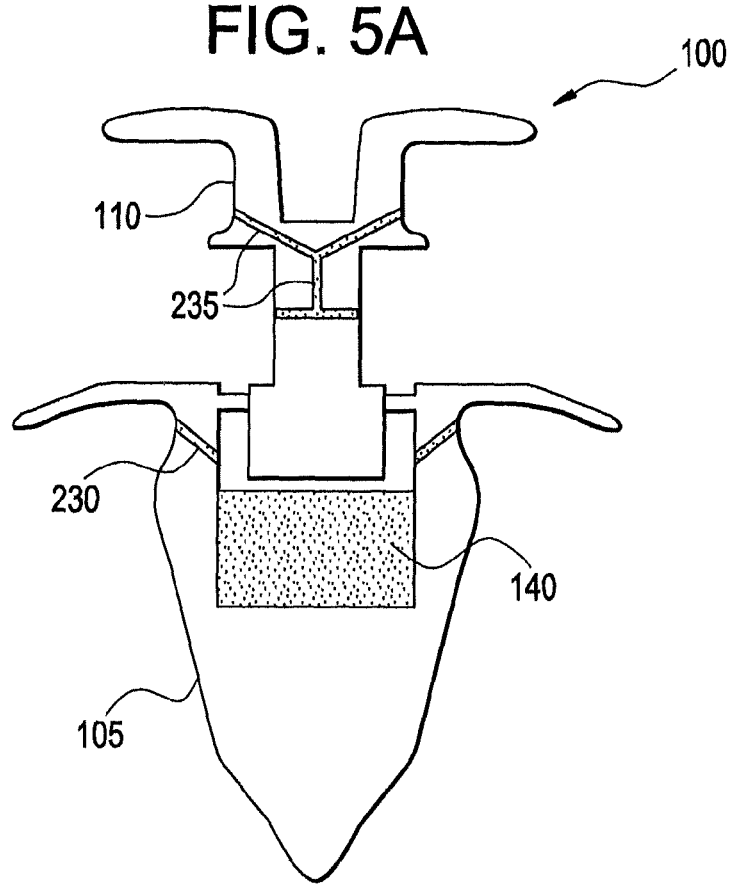
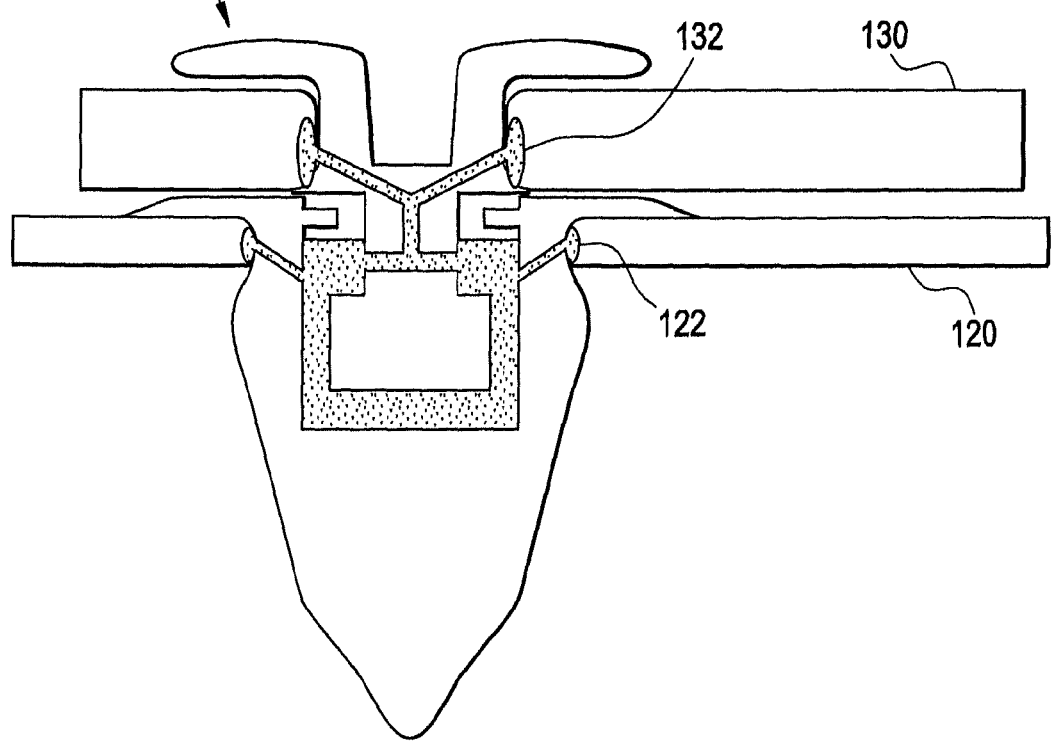

US 8,359,715 B2

TRIM CLIP

CROSS REFERENCE TO RELATED APPLICATIONS

This application claims the benefit of U.S. Provisional Application Ser. No. 60/892,012, filed Feb. 28, 2007, which is incorporated herein by reference in its entirety.

BACKGROUND OF THE INVENTION

The present disclosure relates generally to couplings, more specifically to trim clips, and particularly to trim clips with lateral float capability that are useful for fastening panels to structural parts, and even more particularly are useful in the automotive industry.

An existing trim clip useful for fastening a panel to a structural part includes a one-piece clip having a double flange arrangement on a deformable body, where the first flange seats against the structural part after the deformable body is pushed through a hole therein, and the panel also having a hole therein is sandwiched between the first and second flanges.

Another existing trim clip useful for fastening a panel to a structural part includes a two-piece clip having a similar double flange arrangement and deformable body as discussed above, but with a push pin that is axially driven through a hole in the center of the clip to flair out legs of the deformable body on the underside of the structural part once the clip body is pushed through a hole in the structural part. As with the first trim clip, the panel includes a hole for receiving the trim clip, which captivates the panel between the double flanges of the trim clip.

While existing trim clips are suitable for their intended purpose, if the holes in the panel and the structural part do not line up within a required positional tolerance, the result may be any one of: deformation of the trim part; misalignment of the trim part with respect to the structural part; or, lack of full engagement of the clip in the locating hole of the structural part.

Accordingly, there remains a need in the art for a trim clip arrangement that overcomes these drawbacks.

BRIEF DESCRIPTION OF THE INVENTION

An embodiment of the invention includes a trim clip for securing a panel to a structural part, the trim clip including: a captivating part having an anchor; a body part having a cavity for receiving the anchor; and means for locking the captivating part to the body part. Wherein the body part is engageable with the structural part and has a first flange for seating against the structural part. Wherein the captivating part has a second flange for seating against the panel. Wherein the captivating part and the body part in an unlocked state have a lateral float, an axial float, and an angular tilt float therebetween. Wherein the captivating part and the body part in a locked state have substantially no lateral float, no axial float, and no angular tilt float therebetween.

Another embodiment of the invention includes a coupling for securing a panel to a structural part, the coupling including: a captivating part having an anchor, a body part having a cavity for receiving the anchor, and means for locking the captivating part to the body part via the anchor. Wherein the body part is engageable with the structural part. Wherein the captivating part has means for retaining the panel. Wherein the captivating part and the body part in an unlocked state have a lateral float, an axial float, and an angular tilt float therebetween, and wherein the captivating part and the body part in a locked state have substantially no lateral float, no axial float, and no angular tilt float therebetween.

BRIEF DESCRIPTION OF THE DRAWINGS

Referring now to the drawings, which are meant to be exemplary and not limiting, and wherein like elements are numbered alike in the accompanying Figures.

While the several figures illustrated herein are identified as section views, the section lines are omitted for clarity, thereby illustrating schematic cross sections.

DETAILED DESCRIPTION OF THE INVENTION

An embodiment of the invention, as shown and described by the various figures and accompanying text, provides a flexible fastener, also herein referred to as a trim clip, for joining panels, or trim generally, to a structural part. The trim clip allows for lateral float of the panel relative to the structural part, thereby improving perceived quality and visual aesthetics for achieving greater customer satisfaction. The trim clip has a body part and a captivation part that connects with the body part in both an unlocked position and a locked position. In an embodiment, the body part has a deformable body that securely engages with the structural part by insertion through a hole therein. A first flange of the body part seats against the outer surface of the structural part. The body part has a cavity for receiving the captivation part, which includes a second flange for engagement with the panel. The panel has a hole for receiving the engagement part. Lateral clearance between the captivation part and the body part allows for lateral float of the panel relative to the structural part. Once the captivation part with panel engaged is inserted into the body part, fixing means locks the captivation part to the body part. In the unlocked state, the captivating part and the body part have a lateral float, an axial float, and an angular tilt float therebetween. In the locked state, the captivating part and the body part have substantially no lateral float, no axial float, and no angular tilt float therebetween. As used herein, the term "substantially" refers to the degree of locking achieved, the tolerances between locking surfaces, and the flexibility of the material of the locked parts. In an embodiment, the trim clip is made of plastic.

Figure 1A:
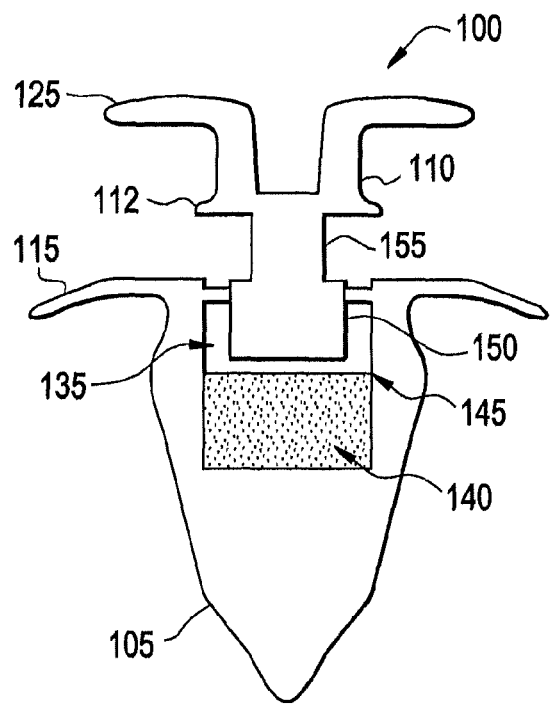
FIGS. 1A,B depict an axial section view a trim clip in accordance with an embodiment of the invention.

Such fixing means will now be described with reference to the various figures. Referring now to FIG. 1A (pre-assembled condition) and FIG. 1B (assembled condition), a trim clip 100 is shown in both the pre-assembled and assembled condition, respectively. The trim clip 100 includes a body part 105 and a captivation part 110. The body part 105 has a first flange 115 for seating against a structural part 120, and the captivation part 110 has a second flange 125 for seating against a trim part (panel) 130, and a shelf 112 for supporting the trim part 130, best seen by referring to FIG. 2. The body part 105 has a cavity 135 for receiving a reservoir of adhesive (glue for example) 140 and a seal 145. During insertion of the captivation part 110 into the cavity 135, an anchor 150 of the captivation part 110 breaks the seal 145 and exposes the anchor 150 to the adhesive 140. Connecting the anchor 150 to the flange section of the captivation part 110 is a stem 155, which is narrower than the anchor 150. Both anchor 150 and stem 155 pass through an opening 160 defined by ribs 165 on body part 105. Due to the difference in dimensions of the width of the anchor 150 and the width of the stem 155 relative to the width of the opening 160, and the difference in dimensions of the width of the anchor 150 and the width of the cavity 135, a degree of lateral float is provided between the captivation part 110 and the body part 105, illustrated by dashed lines 170. This degree of lateral float also provides for a degree of angular tilt, illustrated by dashed lines 175. Dashed lines 170 and 175 exemplify a range of lateral variation and angularity between the captivation part 110 and the body part 105. Also, by appropriately sizing the height of the cavity 135, the length of the anchor 150 and the amount of adhesive 140, float in the axial direction (defined by dashed line 177) between the captivation part 110 and the body part 105 can be suitably managed to accommodate panels 130 of different thicknesses, illustrated by gap 180. Once the adhesive sets, the captivation part 110 and body part 105 are locked in position, and once locked, the relationship between the two clip portions (body part 105 and captivation part 110) is fixed, thereby absorbing the variation between the hole in the panel and the hole in the structural part.

Figure 1B:
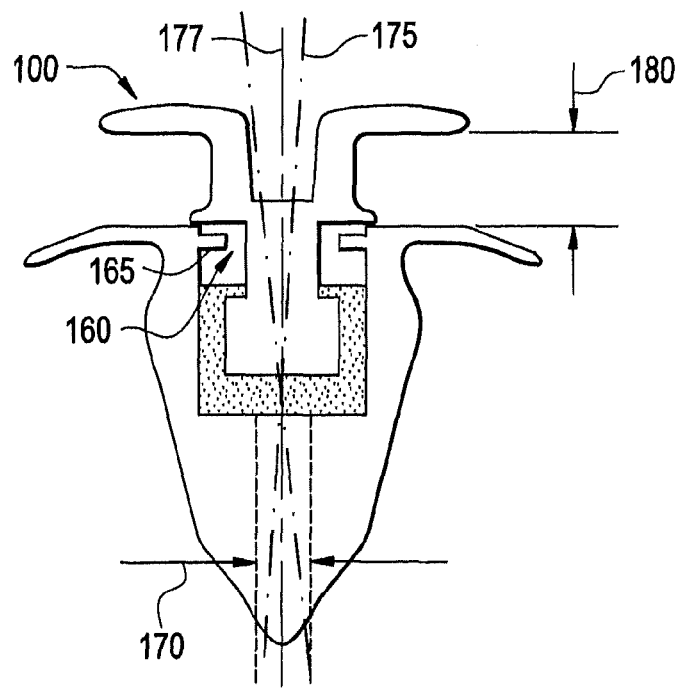
Figure 2:
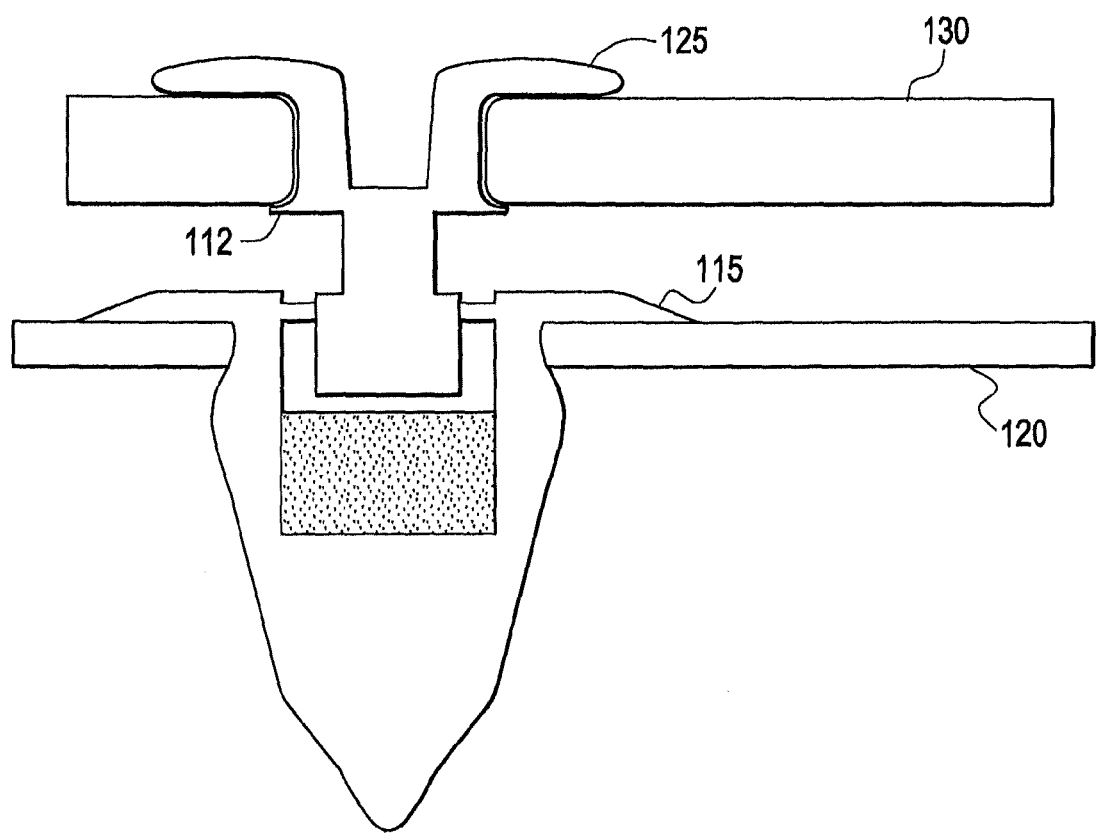
FIG. 2 depicts an axial section view of the trim clip of FIGS. 1A,B in an unlocked position with sectioned portions of a panel and a structural part illustrated.
Figure 3A:
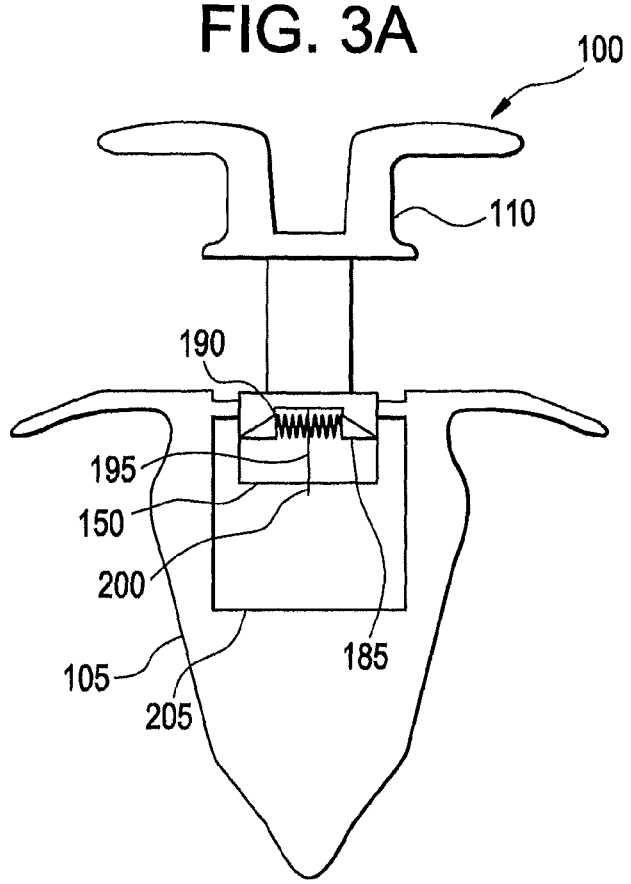
FIGS. 3A,B, 4A,B,C,D,E, F, 5A,B, 6, 7A,B,C,D, 8, 9,A, B,C,D and 10A,B depict section views of alternative trim clip arrangements to that depicted in FIGS. 1A,B.
Figure 3B:
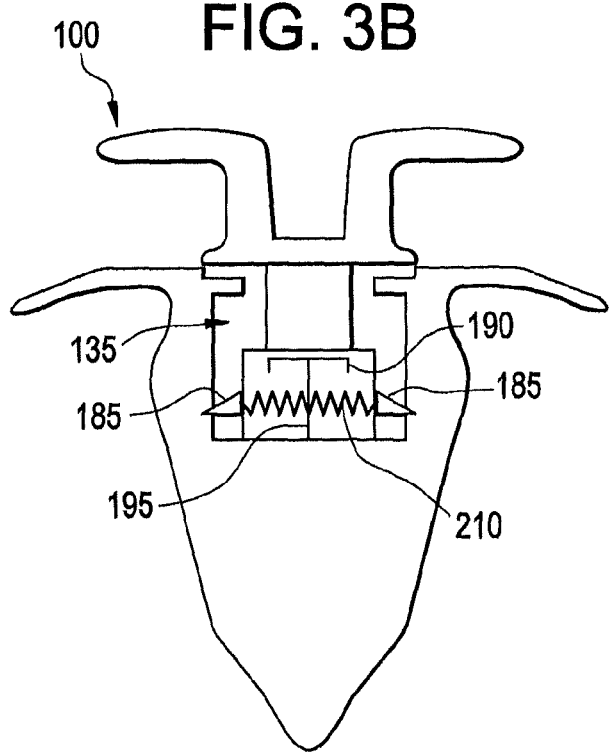

Referring now to FIGS. 3A and 3B, a mechanical locking arrangement of captivation part 110 to body part 105 is illustrated in both the pre-assembled condition and the assembled condition, respectively. Since the basic concept of the trim clip 100 illustrated in FIGS. 3A and 3B is similar to that illustrated in FIGS. 1 and 2, discussion here will be restricted to the difference in the locking means. With reference now to FIGS. 3A and 3B, anchor 150 includes spring loaded spikes 185 that are latched in a retracted position by latches 190 of a "T" plunger 195. In the retracted position, captivation part 110 is unlocked from base part 105. During insertion of captivation part 110 into base part 105, the bottom tip 200 of "T" plunger 195 strikes the floor 205 of cavity 135, causing the "T" plunger to translate axially (lift, relative to the view of FIG. 3A) with respect to the captivation part 110, thereby releasing the latches 190 from spikes 185, and allowing spring 210 to drive the spikes 185 into the interior sides of cavity 135 to lock the captivation part 110 relative to the base part 105. In view of the foregoing description, FIG. 3A is considered to illustrate the spring 210 and spike 185 arrangement to be mechanically unlocked, and FIG. 3B is considered to illustrate the spring 210 and spike 185 arrangement to be mechanically locked. Similar clearances and dimensions as discussed above provide for lateral float, angular tilt float, and axial float of the captivation part 110 relative to the base part 105. Unlike the embodiment of FIGS. 1A and 1B, the embodiment of FIGS. 3A and 3B may be used for permanently locking the captivation part 110 with the body part 105, or for locking and unlocking the captivation part 110 relative to the body part 105.

Figure 4A:
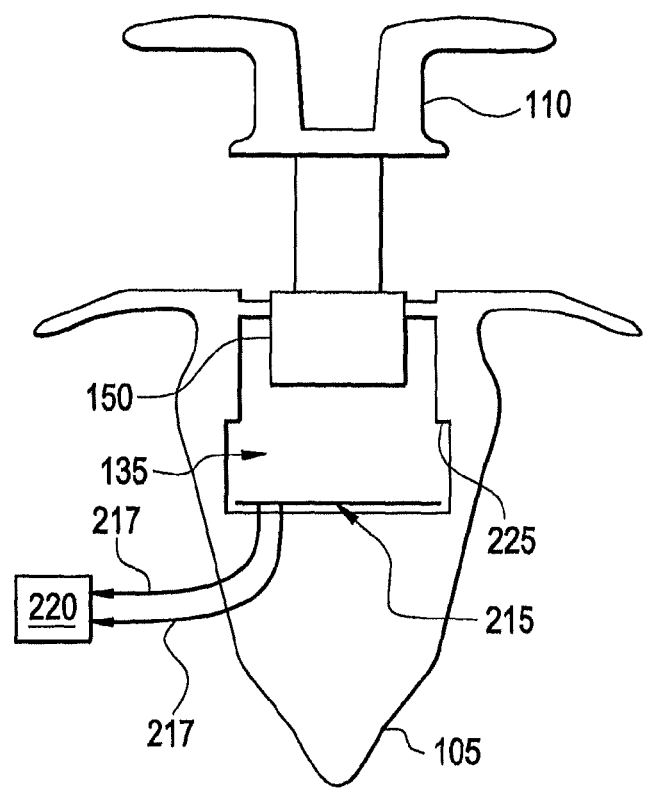
Figure 4B:
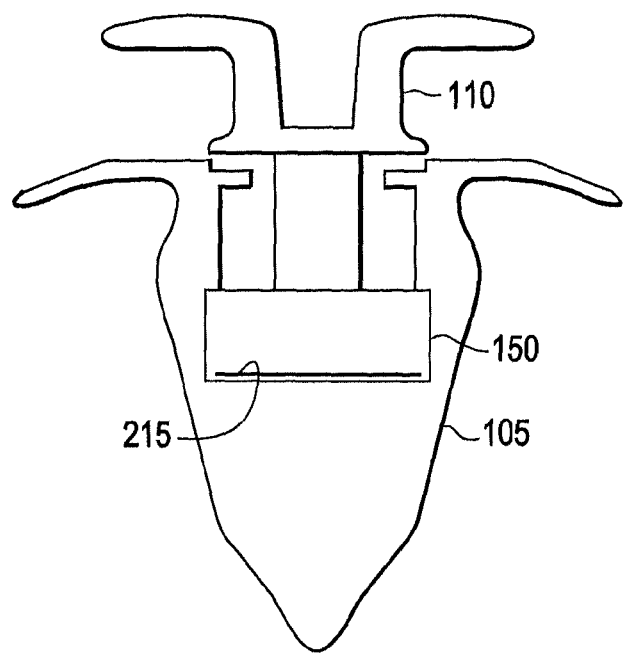

Referring now to FIGS. 4A-4D, an alternative mechanical locking arrangement to that illustrated in FIGS. 3A and 3B is illustrated in both a pre-assembly condition and an assembled condition, respectively. In the embodiment of FIGS. 4A and 4B, anchor 150 comprises a shape memory material, which may be a metal alloy or a polymer. In the pre-assembly condition illustrated in FIG. 4A the shape memory material (generally referred to by reference numeral 150 in association with FIGS. 4A and 4B) is in a retracted pre-memory state, and in the assembled condition illustrated in FIG. 4B the shape memory material is in an expanded memory state. To transition the shape memory to its expanded memory state, a resistive switch 215 on the floor of cavity 135 is used to close an electrical circuit via wires 217 to a power source 220 as captivation part 110 is pushed into body part 105, thereby allowing resistive heating at the switch to elevate the temperature of the shape memory anchor 150 above its memory threshold temperature to cause it to change shape into its expanded memory state. Once the shape memory anchor 150 has changed shape, the electrical circuit may be disconnected. Shape memory anchor 150 may engage with the interior sidewalls of cavity 135 by a press fit arrangement, or may be captivated by an undercut 225 in the sidewalls of cavity 135. Similar clearances and dimensions as discussed above provide for lateral float, angular tilt float, and axial float of the captivation part 110 relative to the base part 105. While the embodiment of FIGS. 4A and 4B has been illustrated using resistive heating to cause a change in state of the shape memory material, it is contemplated that magnetic heating may also be employed. Similar to the embodiment of FIGS. 3A and 3B, the embodiment of FIGS. 4A and 4B may be used for permanently locking the captivation part 110 with the body part 105, or for locking and unlocking the captivation part 110 relative to the body part 105.

In the embodiment of FIGS. 4C (pre-assembly condition) and 4D (assembled condition), another version of electrical resistive heating of the shape memory material 150 is depicted, where one electrical wire 218 passes through flange 115 to the floor 205 of cavity 135, and another electrical wire 219 passes through flange 125 to the bottom of anchor (shape memory material) 150. An electrical heater wire 216 (resistance heating element) is electrically connected at one end to electrical wire 218 at the floor 205, and is switchably connectable at an opposing end to electrical wire 219 at the bottom of anchor 150 upon insertion of captivation part 110 into body part 105. Upon such insertion, electrical wire 219 contacts electrical heater wire 216, which is used to trigger shape memory polymer 150 to expand and lock into position, meanwhile disabling the heating circuit when the desired expansion is achieved. External power 220 is connected to wires 218, 219 to provide the necessary energy for heating electrical heater wire 216. With a shape memory locking arrangement, the trim clip 100 may be unlocked by forcing the circuit to connect and heat up to the glass transition temperature of the shape memory material, thereby returning the shape memory material to its original shape.

Figure 4E:
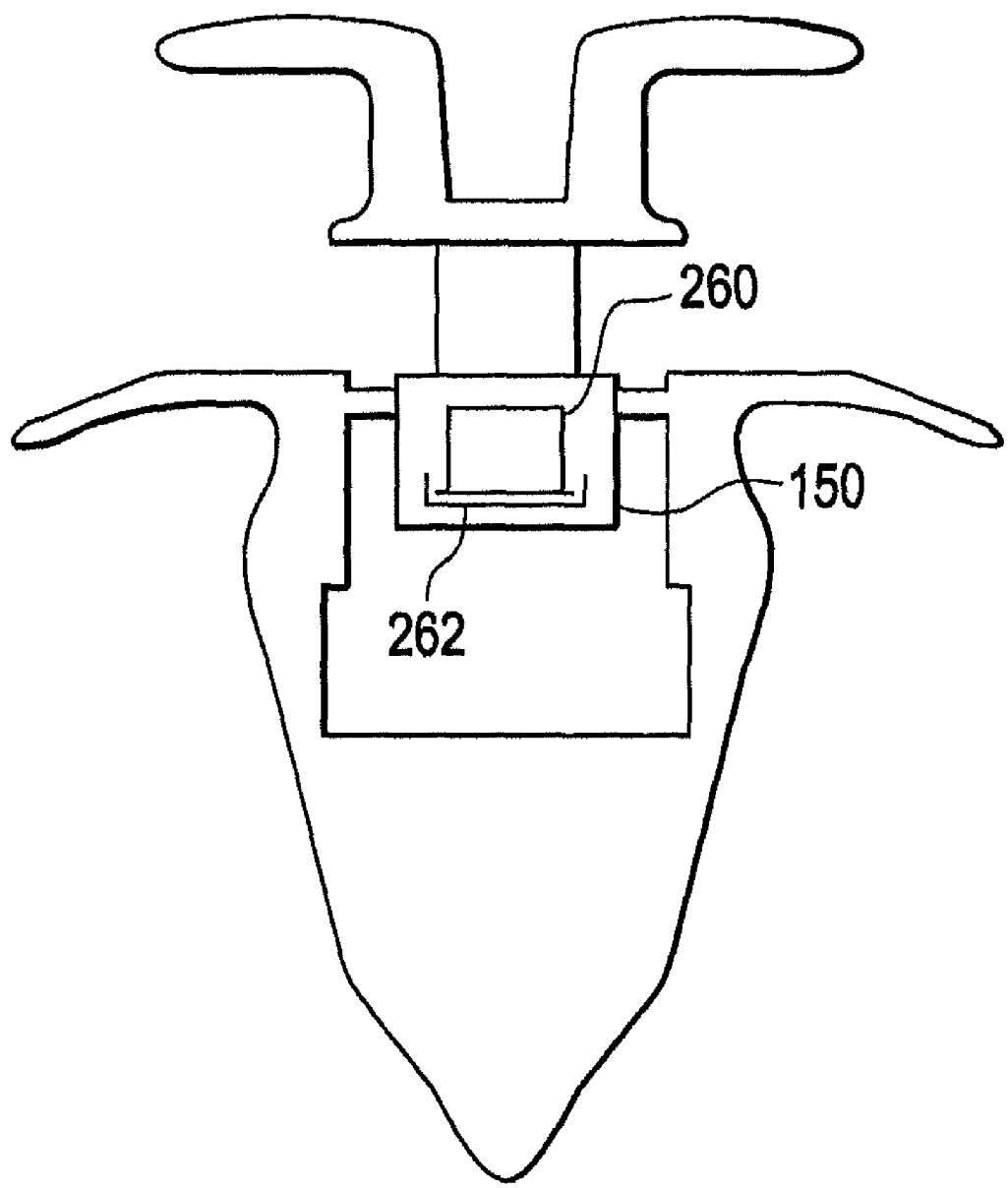
Figure 4F:
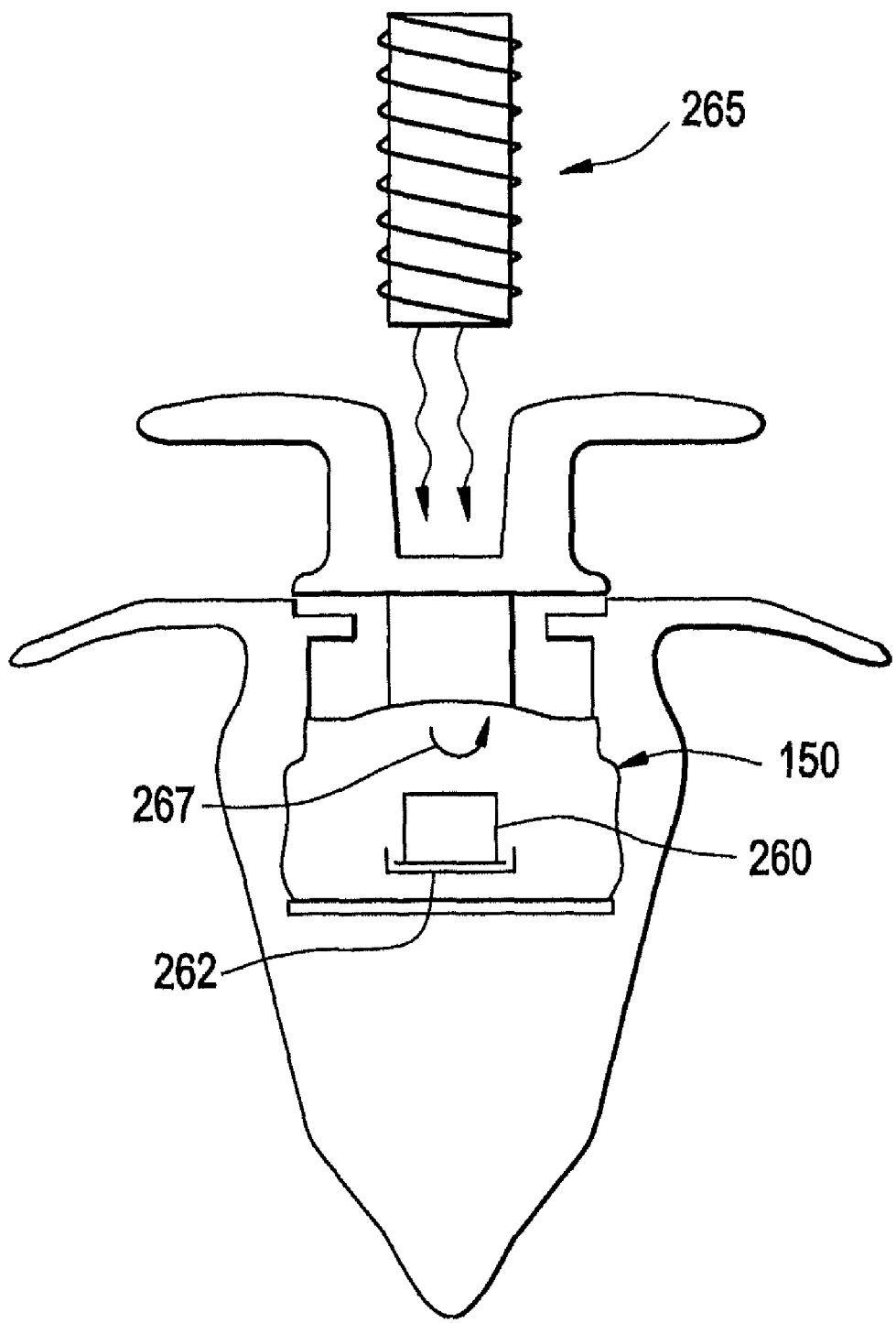

In the embodiment of FIGS. 4E (pre-assembly condition) and 4F (assembled condition), another version of the shape memory locking arrangement is depicted using magnetic heating. Here, a magnet 260 is embedded in the shape memory material of anchor 150, and an electrically powered magnetic field device 265 (such as an installation tool for example) is used to make the magnet block 260 rotate at a defined speed (generally illustrated by reference numeral 267), thereby resulting in a friction heating pad 262 to increase the shape memory polymer temperature for locking. As before, the trim clip 100 may be unlocked by heating up the shape memory polymer to its glass transition temperature, thereby returning the shape memory material to its original shape. As an aside, the electrically powered magnetic field device 265 may also be used to "trip" the spring loaded spikes 185 in the embodiment of FIGS. 3A and 3B.

FIGS. 5A (pre-assembled condition) and 5B (assembled condition) illustrate a variation of the trim clip 100 illustrated in FIGS. 1 and 2, where the body part 105 and the captivation part 110 include capillary tubes 230 and 235, respectively, for delivering adhesive 140 to the structural part 120 and the panel 130 (see regions 122, 132 under flanges 115, 125, respectively) once the captivation part 110 is assembled to the body part 105. An advantage of the embodiment of FIGS. 5A and 5B is a reduction in vibration of the captivated parts and improved acoustical sealing upon curing of the adhesive.

Figure 6:
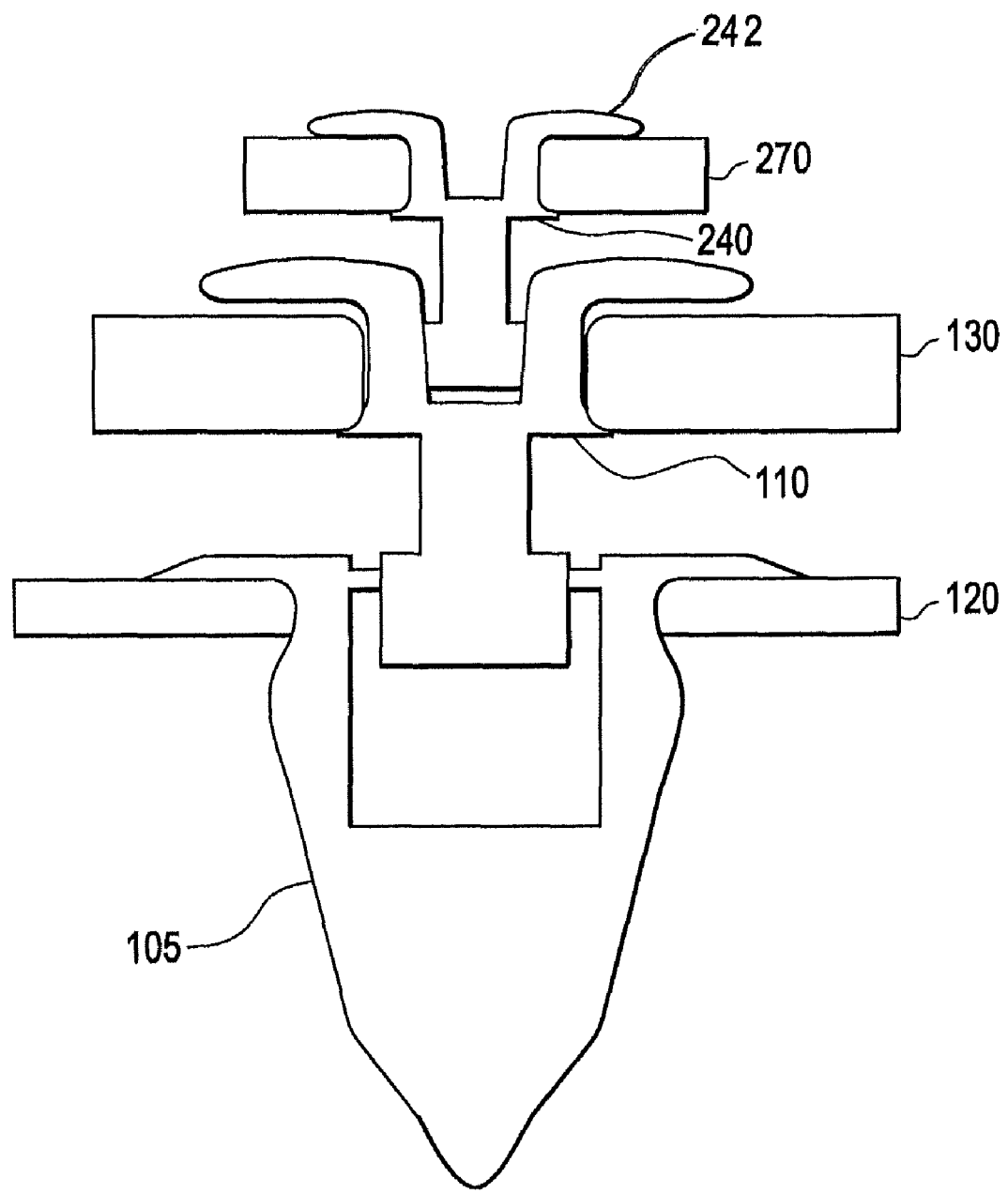

FIG. 6 illustrates a variation of one or more of the foregoing embodiments, where a first captivation part 110 engages with a body part 105 as discussed above, and a second captivation part 240 engages the first captivation part 110 in a manner similar to one previously discussed above. Second captivation part 240 includes a flange 242 for engaging panel 270. As such, embodiments of the invention are not limited to just one panel being connected to a structural part, but also include arrangements for connecting multiple panels 130, 270 with different alignment and thickness considerations to a structural part 120.

Figure 7A:
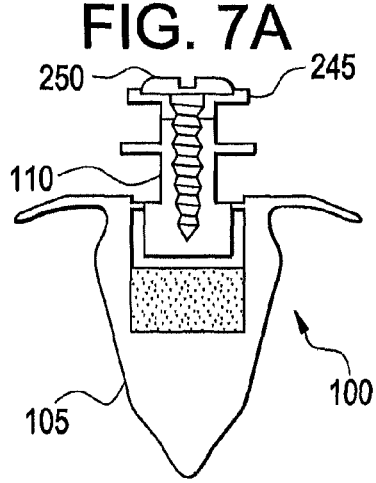
Figure 7B:
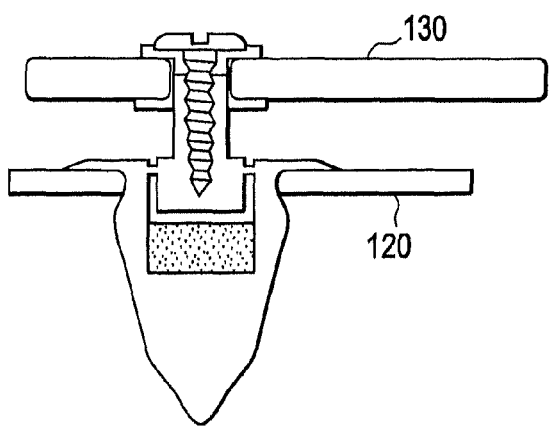
Figure 7C:
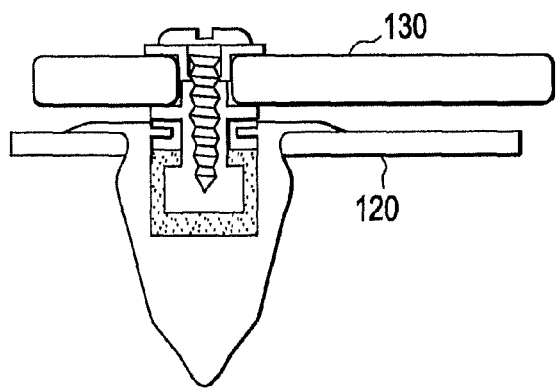
Figure 7D:
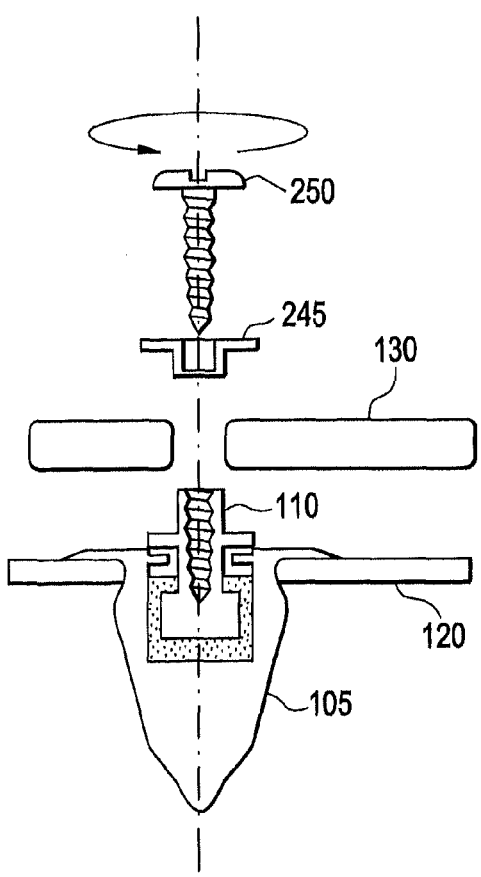

FIGS. 7A-7D illustrate a variation of one or more of the foregoing embodiments, where captivation part 110 includes a removable cap 245 for permitting disassembly of panel 130 from structural part 120 after the respective parts and trim clip 100 have been assembled. While FIGS. 7A-7D illustrate the use of a screw 250 for fastening removable cap 245 to captivation part 110, it is understood that any other fastener suitable for the purposes disclosed herein may be used in place of screw 250. In summary, FIG. 7A illustrates a pre-installation condition, FIG. 7B illustrates a partially installed condition, FIG. 7C illustrates a fully installed condition, and FIG. 7D illustrates a disassembled condition for service.

Figure 8:
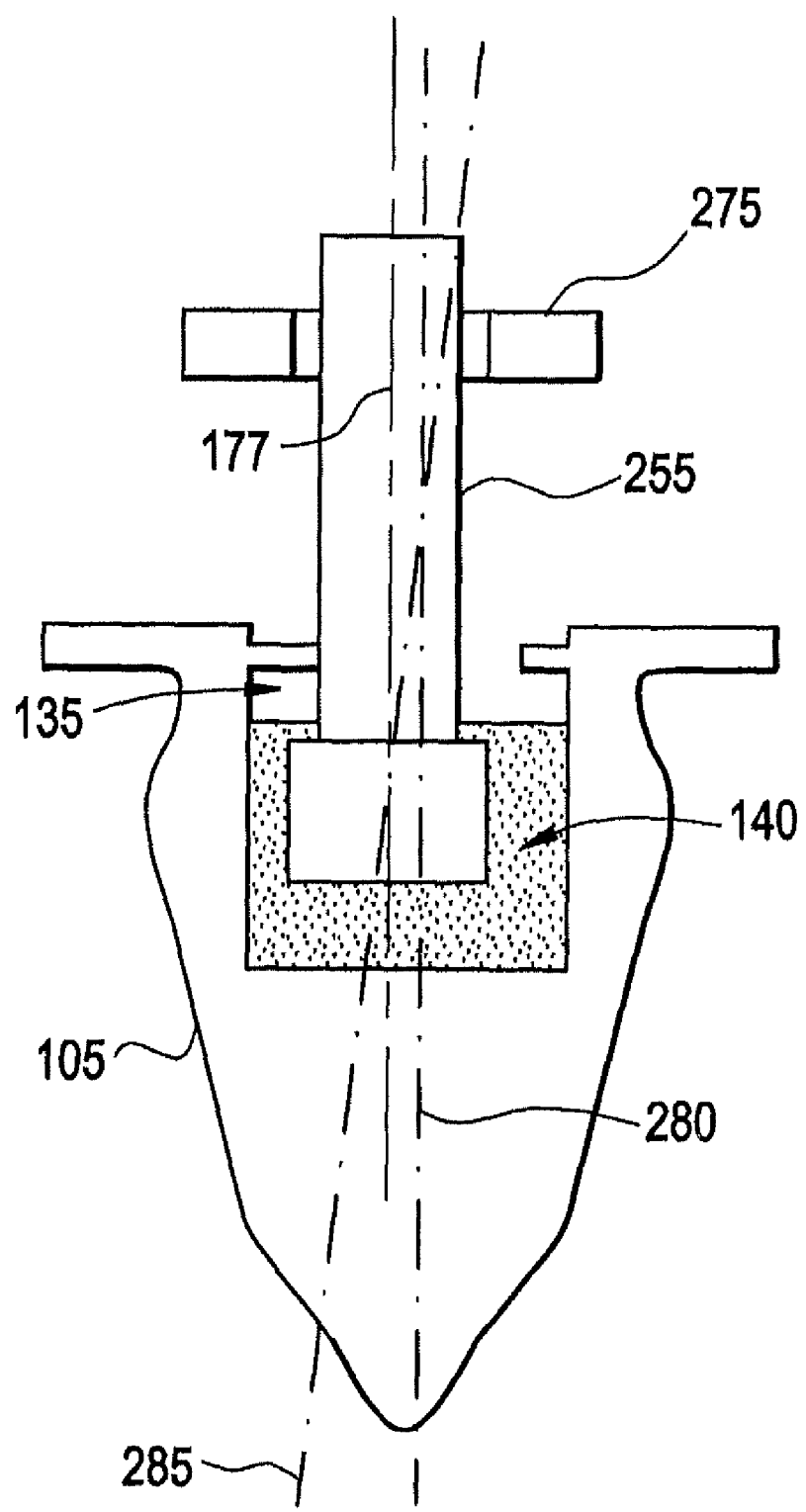

FIG. 8 illustrates a variation of one or more of the foregoing embodiments, where captivation part 110 is replaced by a locating stud member 255. Here, the body part 105 is positioned as discussed above in a structural part (not shown but understood as described above), and the locating stud member 255 will be inserted into cavity 135, oriented as needed, and locked in position as discussed above (such as adhesive 140 as illustrated, but not limited to adhesive as discussed above). Locating stud member 255 may be a post for welding or for receiving a spring clip or cap 275, or a threaded stud for receiving a nut (also generally referred to by reference numeral 275). In the embodiment of FIG. 8, vertical, lateral and axial positioning of locating stud member 255 relative to body part 105 can be managed within a defined window of variation, as illustrated by dashed lines 280, 285 relative to axis 177.

Figure 9A:
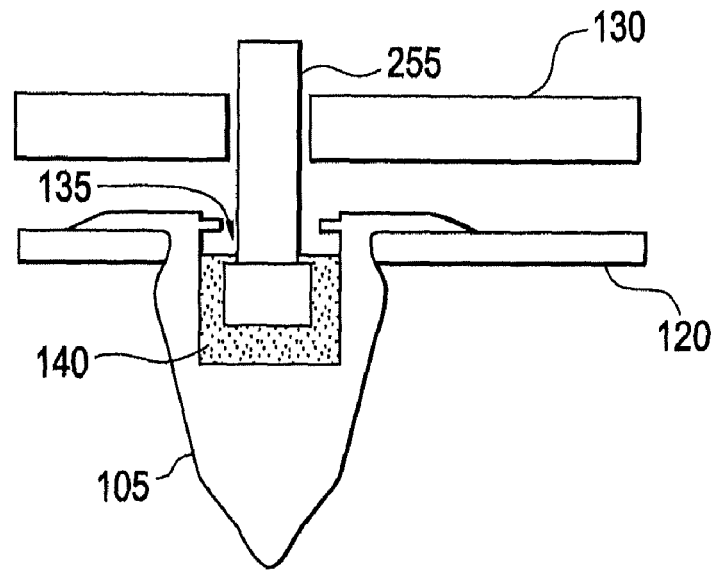
Figure 9B:
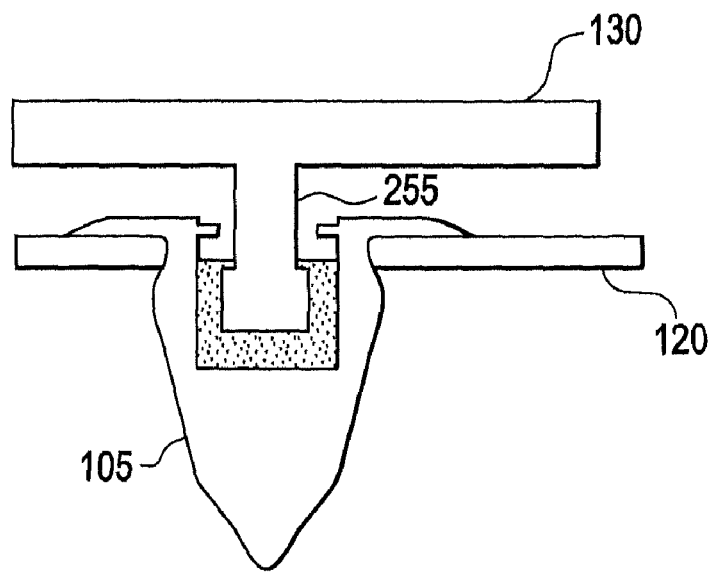
Figure 9C:
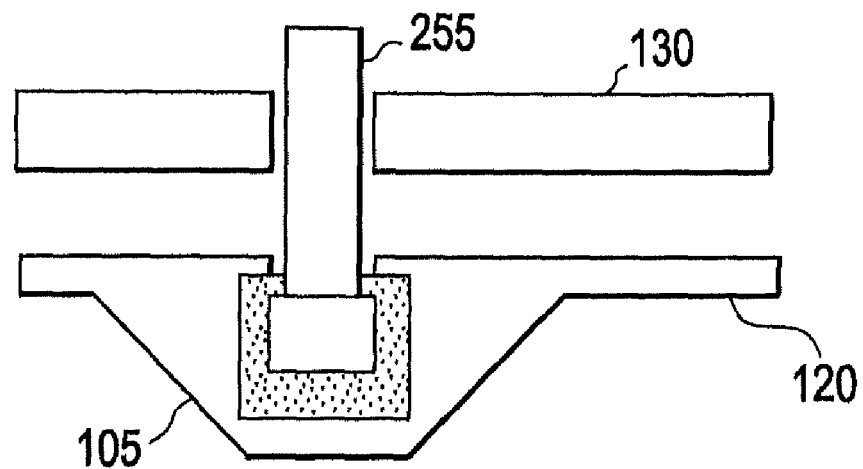
Figure 9D:
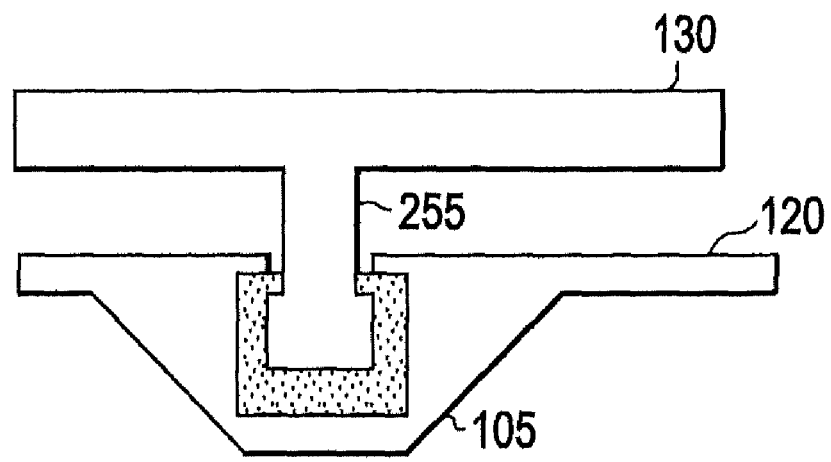

FIGS. 9A-9D illustrate variations of the locating stud member 255 arrangement illustrated in FIG. 8. FIG. 9A illustrates a first configuration that illustrates the arrangement of FIG. 8, FIG. 9B illustrates a second configuration that illustrates an arrangement where the locating stud member 255 is integral with the panel 130, FIG. 9C illustrates a third configuration that illustrates an arrangement where body part 105 is integral with structural part 120, and FIG. 9D illustrates a fourth configuration that illustrates an arrangement that combines the second configuration of FIG. 9B with the third configuration of FIG. 9C. While FIGS. 9A-9D illustrate cavity 135 having adhesive 140, it will be appreciated that any fixing means discussed above may be employed in place of or in conjunction with adhesive 140.

Figure 10A:
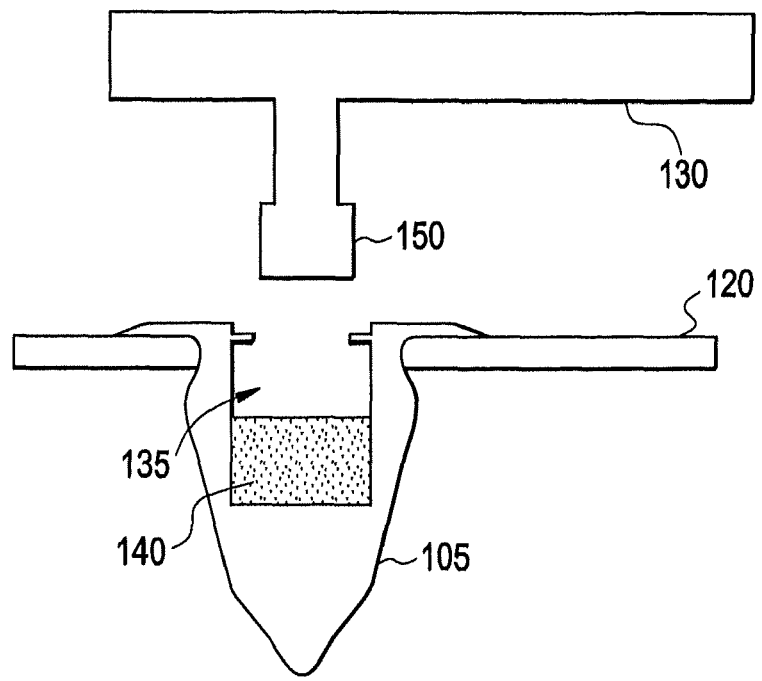
Figure 10B:
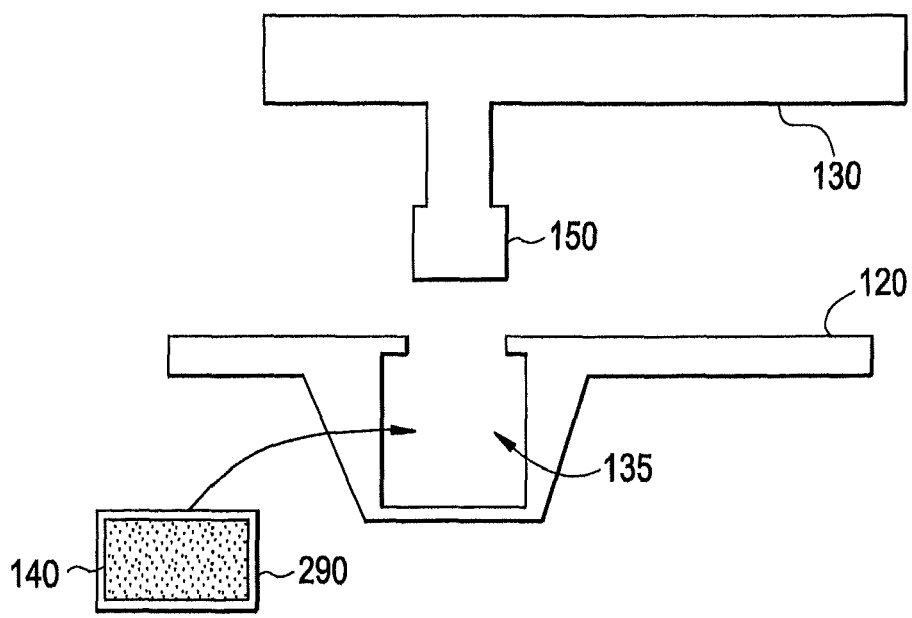

FIGS. 10A and 10B illustrate a variation of one or more of the foregoing embodiments, where the adhesive 140 may be inserted into cavity 135 at the time of assembly of panel 130 to structural part 120 (see block of adhesive 140 in FIG. 10B), instead of being pre-injected into cavity 135 and sealed via seal 145 (seal not shown in FIG. 10 but similar to that shown in FIG. 1B). A breakable skin 290 formed over the block of adhesive 140 delays curing of the adhesive until broken by insertion of anchor 150 of panel 130 into cavity 135 of body part 105. FIG. 10A illustrates a sixth configuration that is similar to the second configuration of FIG. 9B, and FIG. 10B illustrates a seventh configuration that is similar to the fourth configuration of FIG. 9D.

Figure 11:
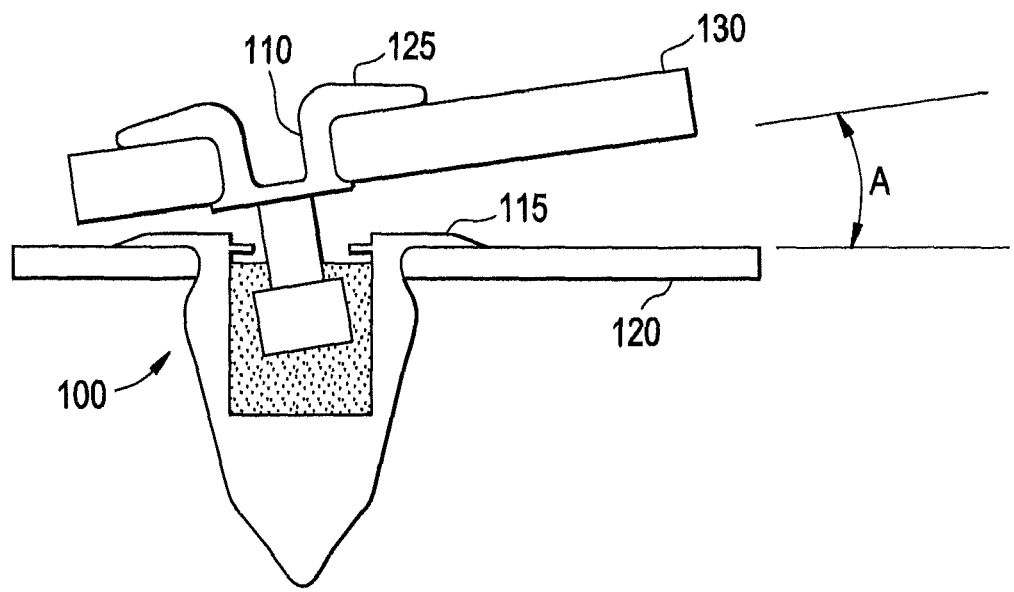
FIG. 11 depicts a section view of the trim clip of FIGS. 1A,B with an angular tilt.
Figure 12:
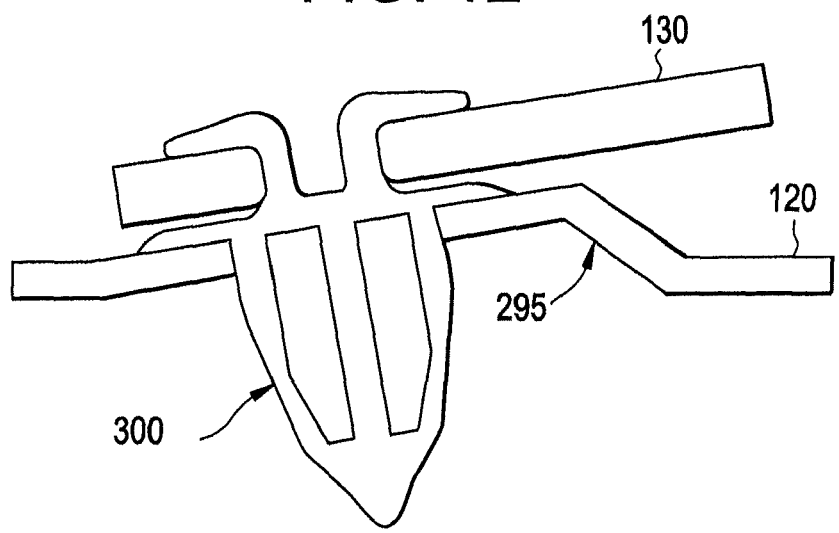
FIG. 12 depicts a section view of a prior art clip for comparison with FIG. 11.

FIG. 11 illustrates an advantage of embodiments of the invention disclosed herein. For example, if it is desirable, or required, for panel 130 to have an angle "A" relative to structural part 120, the angular tilt float discussed above that is available with trim clip 100 will permit the flange 115 of body part 105 to be oriented with structural part 120, and the flange 125 of captivation part 110 to be oriented with panel 130, without the need for creating an embossment 295 in structural part 120 to set up the appropriate angle "A", as is the case with an existing trim clip 300 not having angular tilt allowance, see FIG. 12 for example. Once the panel 130 is put into place relative to structural part 120, any of the fixation means discussed above may be used to hold the panel 130 in place.

While embodiments of the invention have discussed trim clip 100 having two parts that fit and lock together using an adhesive or other mechanical fixation means, it is contemplated that any sort of fixation means may be used, such as any type of bonding agent, a self curing agent, heat or chemically activated bonding, mechanical joining, magnetic joining, and fixation using shape memory materials, where some of these fixation means would provide the option for disassembly of parts for service, replacement, or finesse, for example. It is also contemplated that the fixation means may include any combination of an adhesive locking arrangement, a spring-loaded spike locking arrangement, and a shape memory material locking arrangement. For example, a reservoir of adhesive may be disposed within the cavity of the body part regardless of whether the anchor is a static form of plastic, or includes spring-biased spikes or a shape memory material.

While embodiments of the invention have been discussed using a plastic trim clip, it is contemplated that the scope of the invention also includes trim clips made out of any type of material that is suitable and compatible with the composition of the components being joined together, including High Strength Steel (HSS) fasteners for HSS application.

While embodiments of the invention have been discussed suggesting a two-piece trim clip arrangement with a self contained glue feature that is installed as a direct replacement for a traditional molded clip, it is contemplated that the scope of the invention also includes fasteners that could be designed, supplied, and presented to a vehicle as individual components, or multiple components supplied and presented as separate pieces, where the glue or retention feature can be self contained or supplied and inserted separately. It is also contemplated that part of the fastener could be a feature of the components being joined together. It is further contemplated that the fasteners could be of three or more pieces for joining three or more components, for example.

While embodiments of the invention have been discussed suggesting a fastener for retaining and/or locating two parts, it is contemplated that the scope of the invention also includes devices for locating only, and that such devices could be of any configuration discussed above.

While embodiments of the invention imply that the trim clip could be manufactured, supplied and even pre-installed and presented to the assembly location as a single self-contained device, it is contemplated that portions of the trim clip could be unique to a specific application and supplied separately. Portions could also be common to different applications and supplied in bulk quantity. The adhesive component could be added at a point of usage for shelf life, cost, quality, or failure considerations. Generally speaking, the trim clips could be supplied to a final assembly stage in any state of pre-assembly.

While embodiments of the invention have been described in terms of a trim clip, it will be appreciated that a broader interpretation would generally include a coupling, since FIGS. 9D and 10B clearly illustrate embodiments of the invention where elements of a trim clip are integrally arranged with elements of a structural part and/or a trim part to form a coupling therebetween. As such, the scope of the invention is not intended to be limited to a trim clip component that is separate from a structural and/or trim part.

As disclosed, some embodiments of the invention may include some of the following advantages: the pre-locking lateral float characteristic will enable stress-free assembly, best fit assembly, finesse after assembly during a controlled time period, and improved repair/serviceability re-assembly results; potential ergonomic gains in some applications; and, energy absorption potential in applications utilizing the capillary bonding arrangement of components that bear a direct end load.

Further to all of the above, it is contemplated that specific tools may be utilized to install, lock, unlock, or remove the proposed trim clip designs for service or replacement. These tools are also considered to be within the scope of the invention disclosed herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may be employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A trim clip for securing a panel to a structural part, the trim clip comprising:
   a captivating part having an anchor;
   a body part having a cavity for receiving the anchor; and
   means for locking the captivating part to the body part via the anchor;
   wherein the body part is engageable with the structural part and has a first flange for seating against the structural part;
   wherein the captivating part has a second flange for seating against the panel;
   wherein the captivating part and the body part in an unlocked state are separate pieces and have a lateral float, an axial float, and an angular tilt float therebetween; and
   wherein the captivating part and the body part in a locked state have substantially no lateral float, no axial float, and no angular tilt float therebetween;
   wherein the body part is configured to be coupled to the structural part by movement of the body part in a first direction toward the structural part, and the captivating part is coupled to the body part in such a manner as to allow movement of the captivating part toward the body part in the first direction for securing the panel to the structural part;
   wherein the captivating part, relative to the body part, is positionable in a first position and a second position, the first position corresponding to the unlocked state and the second position corresponding to the locked state;
   wherein the body part further comprises a seal integrally formed with the body part and disposed to engage with the anchor to seal off the cavity in response to the captivating part being disposed in the first position.

2. The trim clip of claim 1, wherein the captivating part further comprises a shelf for supporting the panel between the shelf and the second flange.

3. The trim clip of claim 1, wherein the body part has a deformable section for engaging with the structural part.

4. The coupling of claim 1, wherein:
   the captivating part further comprises a stem, the anchor being fixed to the second flange via the stem, the stem being narrower than the anchor; and
   the body part further comprises a rib that defines an opening in the body part, the anchor and the stem being insertable through the opening such that when the anchor is inserted beyond the opening into the cavity of the body, a gap is present between the stem and the rib for providing the lateral float and the angular tilt float when the captivating part and the body part are in the unlocked state.

5. A coupling for securing a panel to a structural part, the coupling comprising:
   a captivating part having an anchor;
   a body part having a cavity for receiving the anchor; and
   means for locking the captivating part to the body part via the anchor;
   wherein the body part is engageable with the structural part;
   wherein the captivating part has means for retaining the panel;
   wherein the captivating part and the body part in an unlocked state are separate pieces and have a lateral float, an axial float, and an angular tilt float therebetween; and
   wherein the captivating part and the body part in a locked state have substantially no lateral float, no axial float, and no angular tilt float therebetween;
   wherein the body part is configured to be coupled to the structural part by movement of the body part in a first direction toward the structural part, and the captivating part is coupled to the body part in such a manner as to allow movement of the captivating part toward the body part in the first direction for securing the panel to the structural part;
   wherein the captivating part, relative to the body part, is positionable in a first position and a second position, the first position corresponding to the unlocked state and the second position corresponding to the locked state;

wherein the body part further comprises a seal integrally formed with the body part and disposed to engage with the anchor to seal off the cavity in response to the captivating part being disposed in the first position.

6. The coupling of claim 5, wherein the captivating part defines a threaded or non-threaded stud receptive of a nut or retaining clip thereby providing the means for retaining the panel.

7. The coupling of claim 5, wherein the panel is integrally formed with the captivating part.

8. The coupling of claim 7, wherein the structural part is integrally formed with the body part.

9. The coupling of claim 5, wherein the structural part is integrally formed with the body part.

10. The coupling of claim 5, wherein:

the captivating part further comprises a flange and a stem, the anchor being fixed to the flange via the stem, the stem being narrower than the anchor; and the body part further comprises a rib that defines an opening in the body part, the anchor and the stem being insertable through the opening such that when the anchor is inserted beyond the opening into the cavity of the body, a gap is present between the stem and the rib for providing the lateral float and the angular tilt float when the captivating part and the body part are in the unlocked state.

* * * * *